March 5, 1935. P. GRITZ 1,993,162
MACHINE FOR FORMING OFFSETS IN SPRINGS
Filed Oct. 13, 1933 7 Sheets-Sheet 1

INVENTOR
Philip Gritz
Chappell Earl
ATTORNEYS

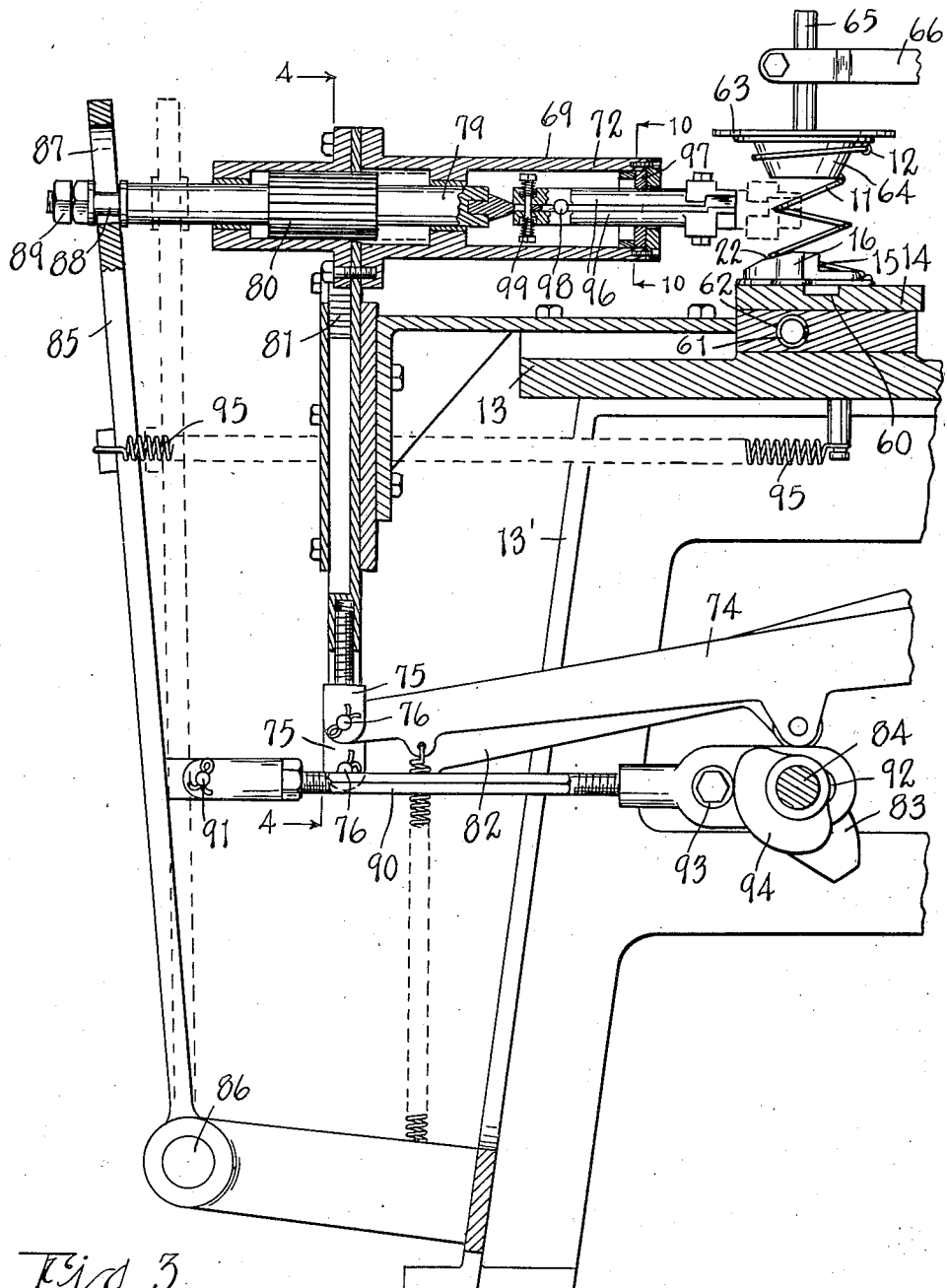

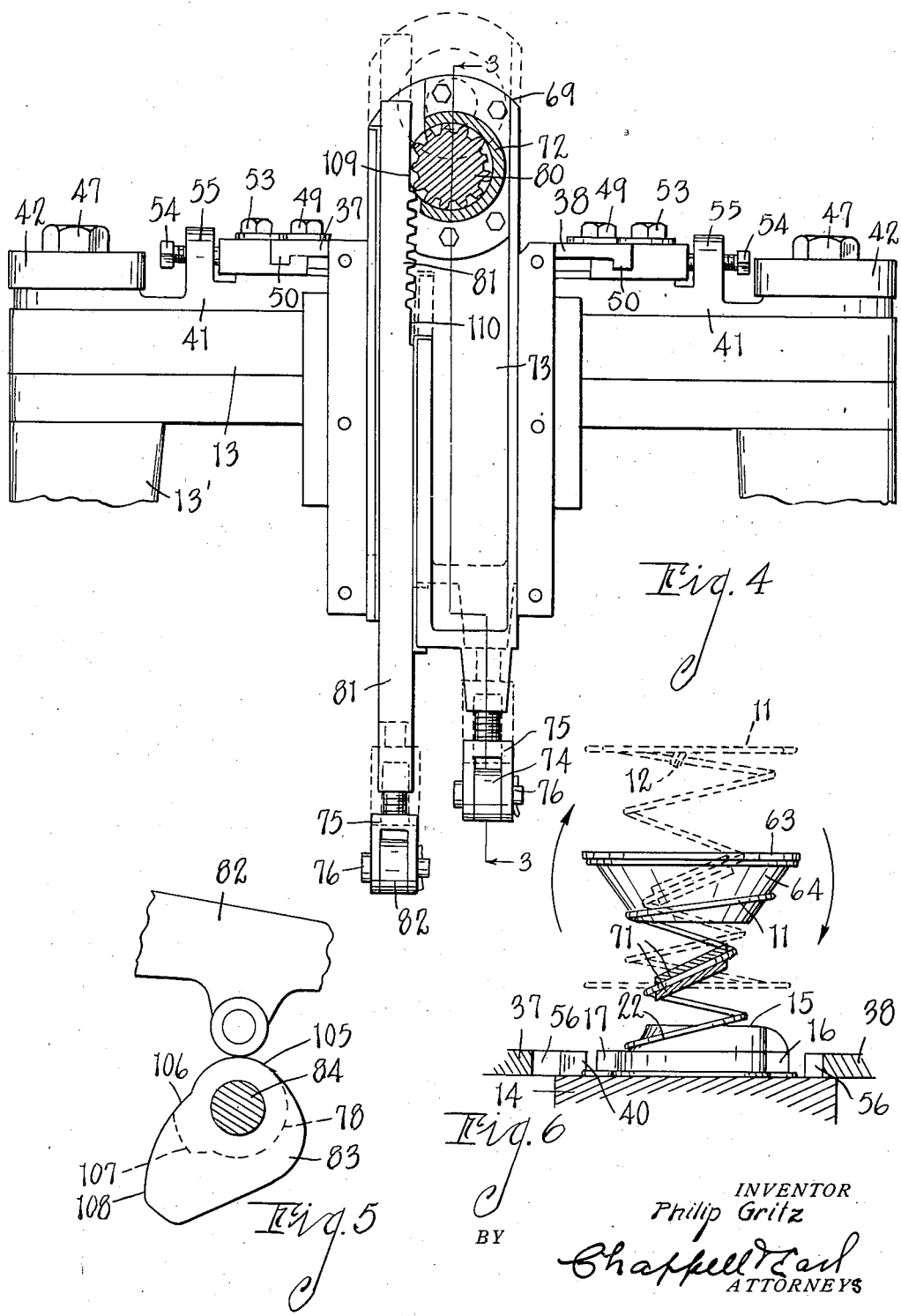

March 5, 1935.  P. GRITZ  1,993,162
MACHINE FOR FORMING OFFSETS IN SPRINGS
Filed Oct. 13, 1933   7 Sheets-Sheet 5
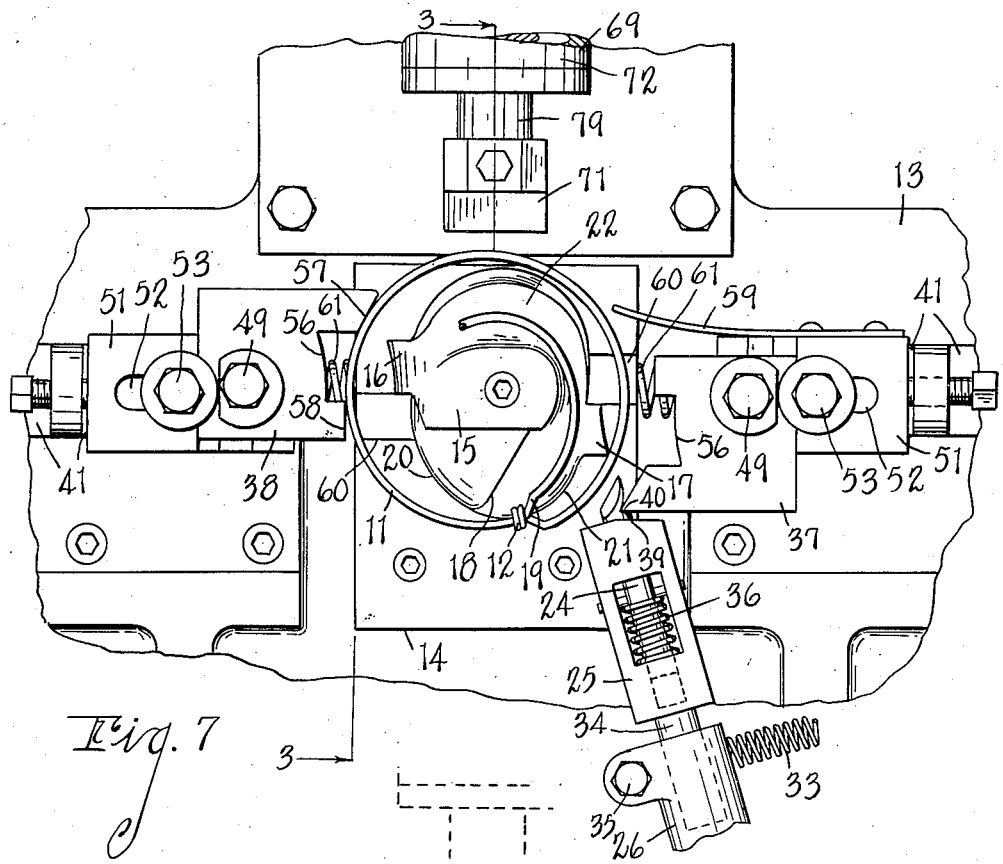
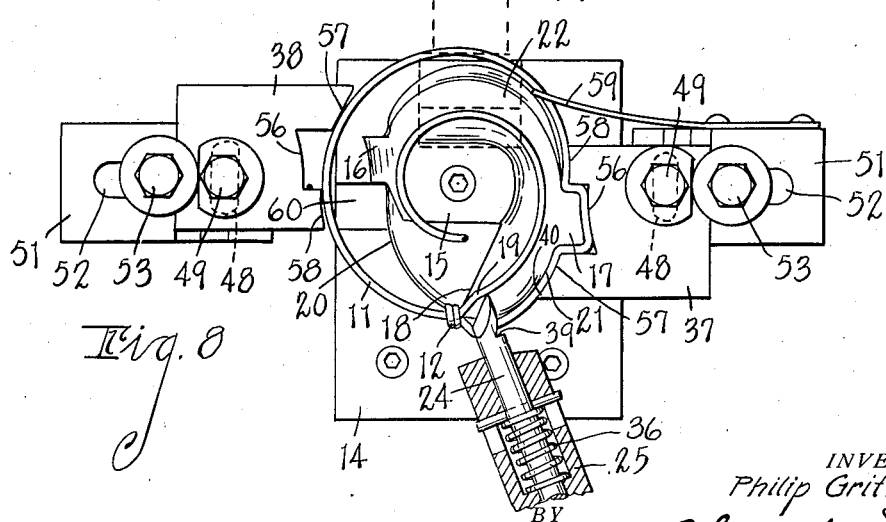
INVENTOR
Philip Gritz

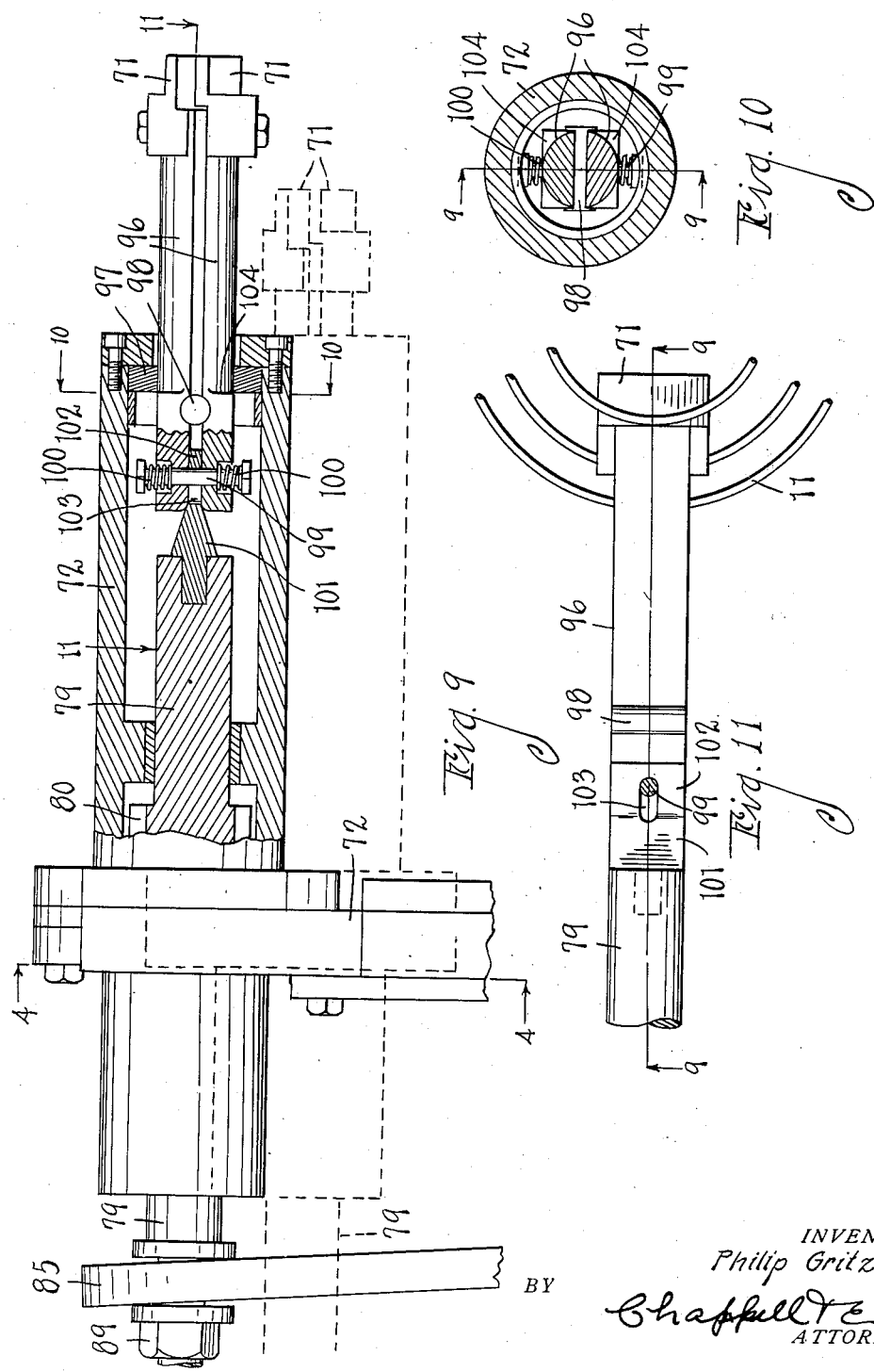

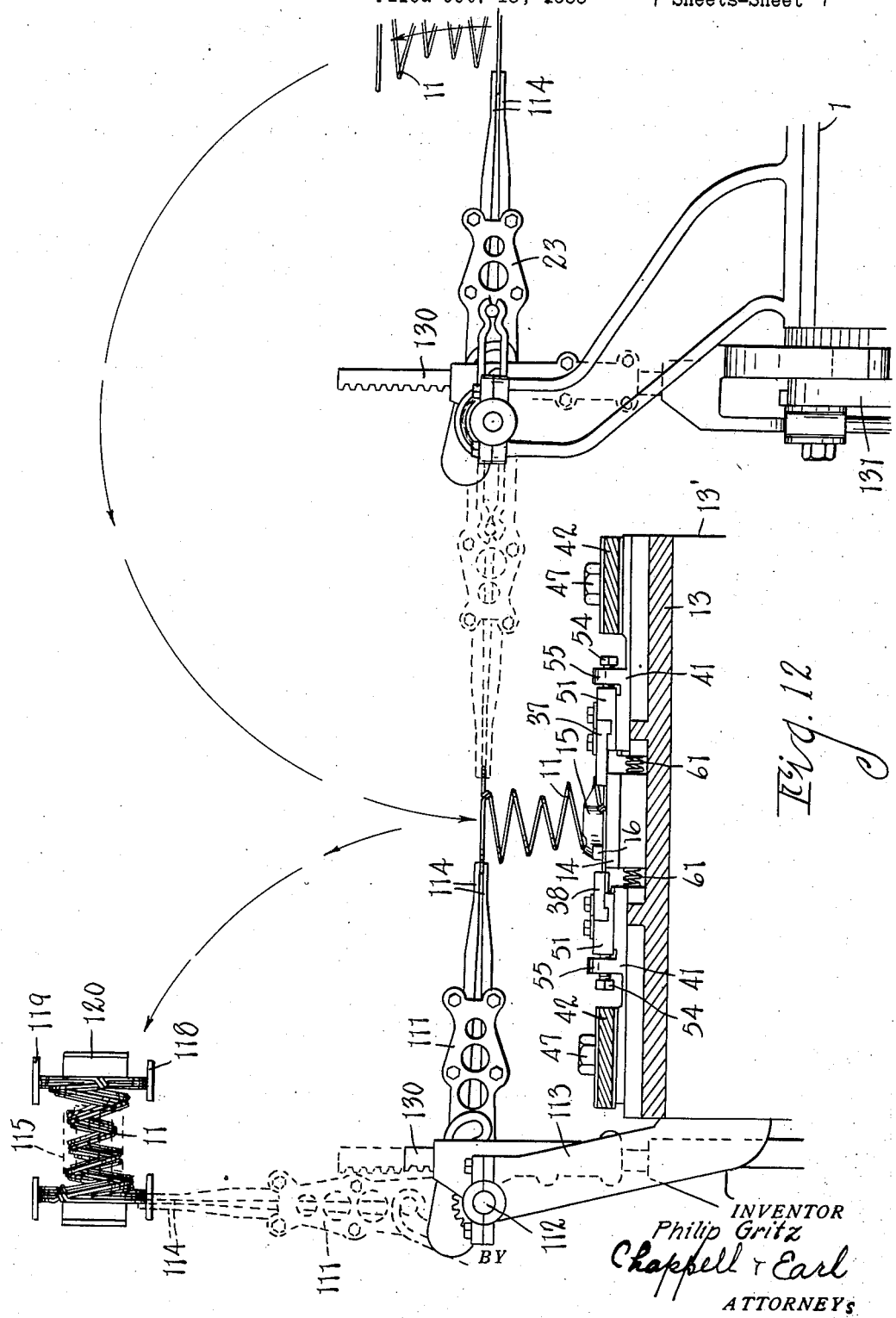

Patented Mar. 5, 1935

1,993,162

UNITED STATES PATENT OFFICE 1,993,162

MACHINE FOR FORMING OFFSETS IN SPRINGS

Philip Gritz, Detroit, Mich., assignor to L. A. Young Spring and Wire Corporation, Detroit, Mich.

Application October 13, 1933, Serial No. 693,419

35 Claims. (Cl. 140—105)

This invention relates to a machine for forming offsets in the end coils of springs such as are employed in bed bottoms, mattresses, cushions, and the like, the offsets being provided to facilitate assembling or to cooperate with connecting members for the springs.

The main objects of the invention are:

First, to provide a machine of this character which is adapted to be directly associated with the spring coiling and knotting machine so that the offsets are formed in the springs as a part of a continuous operation.

Second, to provide a machine of this character which is entirely automatic in its operation, the springs being accurately positioned so that the offsets are formed in predetermined relation to the knots of the springs.

Third, to provide a machine of the character described having a very large capacity.

Fourth, to provide a machine having these advantages which is quite compact and simple in structure.

Objects relating to details and economies of my invention will appear from the description to follow. The invention is defined and pointed out in the claims.

A structure which is a preferred embodiment of my invention is illustrated in the accompanying drawings, in which:

Fig. 3 is an enlarged fragmentary view mainly in vertical section on a line corresponding to line 3—3 of Figs. 1 and 4.

Fig. 4 is an enlarged detail view partially in section on line 4—4 of Figs. 1, 3 and 9.

Fig. 5 is an enlarged fragmentary view in section on line 5—5 of Fig. 2 showing details of the drive or actuating means for the spring reversing mechanism.

Fig. 6 is an enlarged fragmentary view partially in section showing the details for holding the spring in operative relation to the offsetting jaws.

Fig. 7 is an enlarged detail plan view of the offsetting jaws and spring positioning means in open position, a spring being shown in operative relation thereto.

Fig. 8 is a fragmentary plan view of certain of the parts shown in Fig. 7 with the spring positioning means actuated and one of the offsetting jaws closed, the spring gripping position of the reversing member being indicated by dotted lines.

Fig. 9 is an enlarged detail view mainly in longitudinal section on line 9—9 of Figs. 10 and 11, showing the initial position of the spring reversing means by dotted lines and its projected spring engaging position by full lines.

Fig. 10 is a sectional view on line 10—10 of Figs. 1 and 9.

Fig. 11 is a fragmentary view on line 11—11 of Fig. 9.

Fig. 12 is a fragmentary view partially in vertical section on line 12—12 of Fig. 1, showing details of the transfer mechanism for transferring the springs from the spring forming machine to the offsetting station and from offsetting station into operative relation to the nesting mechanism.

Figure 1:
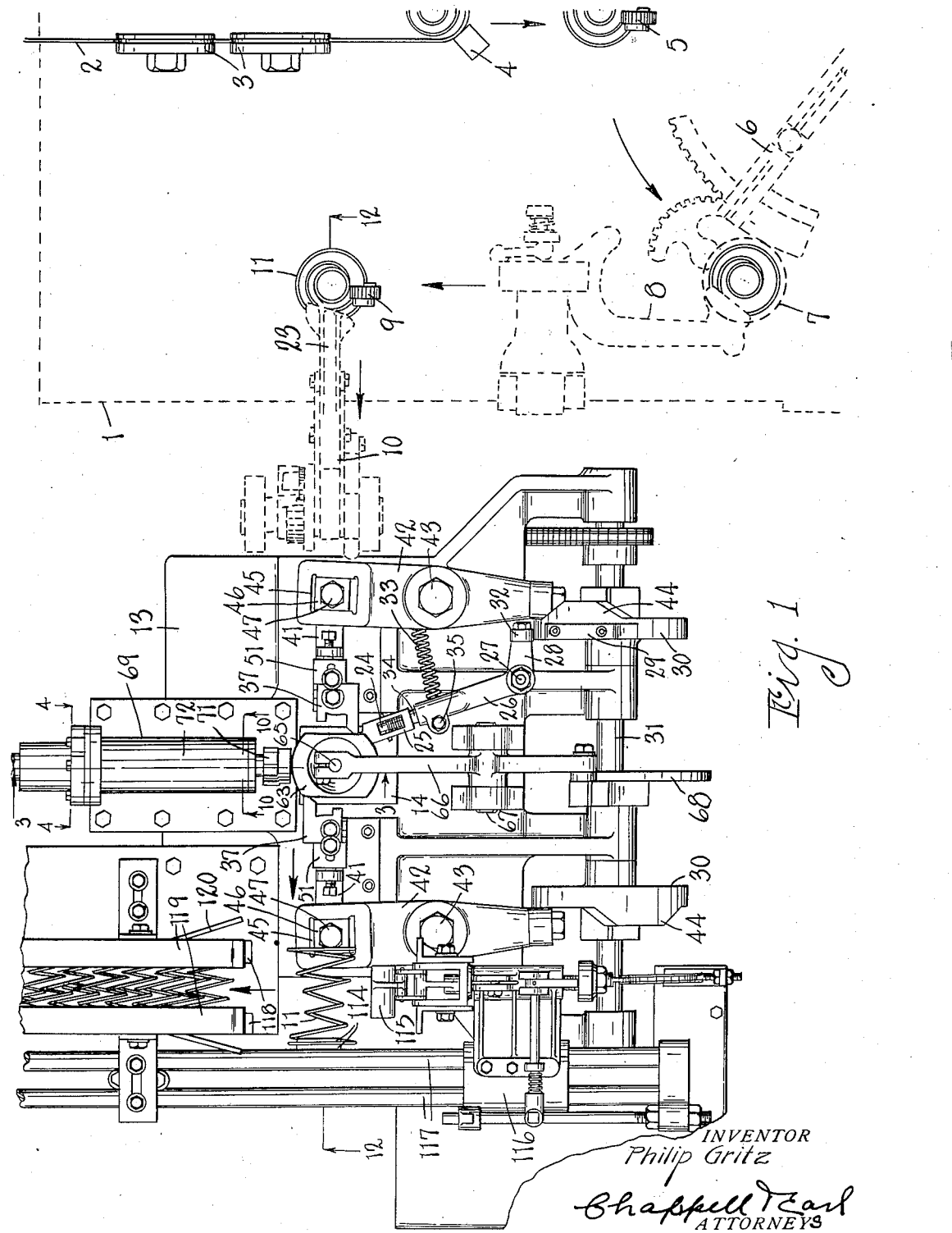
Fig. 1 is a fragmentary plan view of a machine embodying the features of my invention shown in operative relation to a coiling and knotting machine, portions of which are conventionally shown.

In the accompanying drawings, I have illustrated my improved offsetting mechanism in operative relation to an automatic spring coiling and knotting machine designated generally by the numeral 1, this machine being of the type shown in the Van Orman Patent No. 1,528,997 issued March 10, 1925. In that machine, the wire 2 is fed into the machine by suitable feed rolls, as 3, to a coiler shown conventionally at 4. From the coiler, the spring is transferred to a knotter 5. From this knotter, the spring is transferred by a transfer arm 6 to a compressor indicated at 7. From the compressor station, the spring is transferred by the transfer member 8 and also its position reversed to a knotter 9. From this knotter, the spring is transferred to the offsetting machine, the transfer mechanism being designated generally by the numeral 10.

The work or spring is designated generally by the numeral 11, both end coils being knotted or tied, the knot being shown at 12.

The machine is especially adapted for operation on knotted or tied springs but it is operable on unknotted springs although in operating on such springs, certain features of the machine illustrated would have no operative function and could be omitted or rendered inoperative.

The frame 13 consists of a suitable bed or top supported on a pedestal or legs 13' and is of such size that the various operating parts may be operated thereon and supported in proper relation. Mounted centrally on the bed 13 is a work rest 14 carrying the male forming die 15. This forming die has offset projections 16 and 17, as best shown in Figs. 7 and 8, and a positioning shoulder 18 against which the shoulder 19 resulting from the knot 12 is positioned (see Fig. 8). The forming block or anvil has curved supporting surfaces 20 and 21 against which the end coil is thrust and by which it is supported as the offset is formed. The top of the die member or anvil has a spirally curved surface 22 which serves as a support for the portion of the coil adjacent the end coil while in forming position.

The work is positioned upon the rest 14 by means of the swinging transfer arm 23 which, as stated takes the work from the second knotter of the forming machine and with a swinging movement places the work vertically upon the rest, its initial position being shown in Fig. 7 in position to be acted upon by the positioning dog 24 which is reciprocatingly mounted in the head 25 carried by the swinging bell crank lever 26. This bell crank lever is pivoted at 27 and has an arm 28 coacting with the cam 29 carried by the cam member 30 on the cam shaft 31, the cam member 30 having a second cam, the operation of which will appear as the description proceeds. The roller 32 on the arm 28 is held against the periphery of the cam member 30 by means of the coiled spring 33. The head 25 has a stem 34 adjustable in a longitudinal bore in the lever 26 and secured in its adjusted positions by means of the clamping screw 35. The dog is yieldingly urged forward by means of the coiled spring 36 (see Figs. 7 and 8).

In the work stroke of the positioning dog, it swings over the bottom coil of the spring as positioned in Fig. 7 into engagement with the knotted end of the spring, rotating the spring to bring the shoulder 19, resulting from the knotting as described, against the positioning shoulder 18 of the forming die. The positioning dog remains in this position during the offsetting action of the female forming jaw or die 37 (see Fig. 8). There is a corresponding female forming jaw or die 38 on the opposite side of the anvil or stationary die member, these dies or jaws 37 and 38 being duplicates, the jaw 37 however performing a function not performed by the jaw 38; namely, that of holding the positioning dog 24 in retracted position, as shown in Fig. 7, in order to permit the positioning of the work on the work support between the initial positioning thereof by the transfer arm 23 and the reversing, as will be described later.

The positioning dog is provided with a notch-like keeper 39 which is engaged by the nose-like detent 40 on the jaw 37. The parts are brought into position shown in Fig. 7 by the proper timing of the return movement of the jaw and the positioning dog, the initial return movement of the positioning dog acting to engage the notch or keeper with this detent 40, and the parts are then moved in unison so that the positioning dog is forced inwardly against the tension of the spring 36 and is held in the retracted position shown in Fig. 7 until the positioning dog is actuated in proper timed sequence by means of the cam lift 29 on the cam member 30.

The jaws 37 and 38 are mounted on slides 41 mounted in opposed ways in the bed of the machine. These slides are actuated in proper timed relation by means of the actuating levers 42 pivoted at 43 and in proper relation to be actuated by the cams 44 on the cam members 30 carried, as stated, by the cam shaft 31. The levers 42 have longitudinal slots 45 receiving the bearing blocks 46 on the pins 47 projecting from the slides. This allows a straight reciprocatory movement of the slides compensating for the swinging of the actuating levers.

The jaws 37 and 38 are laterally adjustable on the slide, being provided with slots indicated by dotted lines at 48, receiving the attaching bolts 49. Ribs 50 are provided in the jaw supporting or thrust blocks 51 (see Figs. 4, 7 and 8) the thrust locks or jaw holders being adjustably mounted on the slide, having longitudinal slots 52 receiving the clamping bolts 53. Adjusting and thrust screws 54 are provided, these being arranged through lugs 55 on the slides. This provides for accurate adjustment of the jaws. The male die projections 16 are suitably conformed to produce the desired offsets and the final die recesses 56 are correspondingly shaped to coact therewith.

The jaw faces 57 and 58 at each side of the recesses 56 are shaped to effectively engage the work, preventing its being distorted during the offsetting operation. During this offsetting operation, the coil is partially collapsed, the surface 21 of the die block or anvil member opposed to the surface 57 of the jaw being properly curved to support the segment of the coil.

The offsets are successively formed; that is, the jaws 37 and 38, as stated, operated in properly timed relation. This avoids kinking or permanently distorting the coil in which the offsets are formed.

To prevent tilting of the bottom coil during the positioning operation, the slide carrying the jaw 37 is provided with a spring finger 59 (see Figs. 7 and 8), this finger being advanced so that it overlies the bottom coil positioned on the work rest as the positioning dog swings to finally position the work, as shown in Fig. 8.

To insure engagement of the work with the forming jaws, the work support has grooves 60 therein positioned so that the shorter member of the jaws moves into the grooves as the jaws close upon the work. The jaws are retracted by means of coiled springs 61 engaging the slides and seated in the recesses 62 in the work rest.

Figure 2:
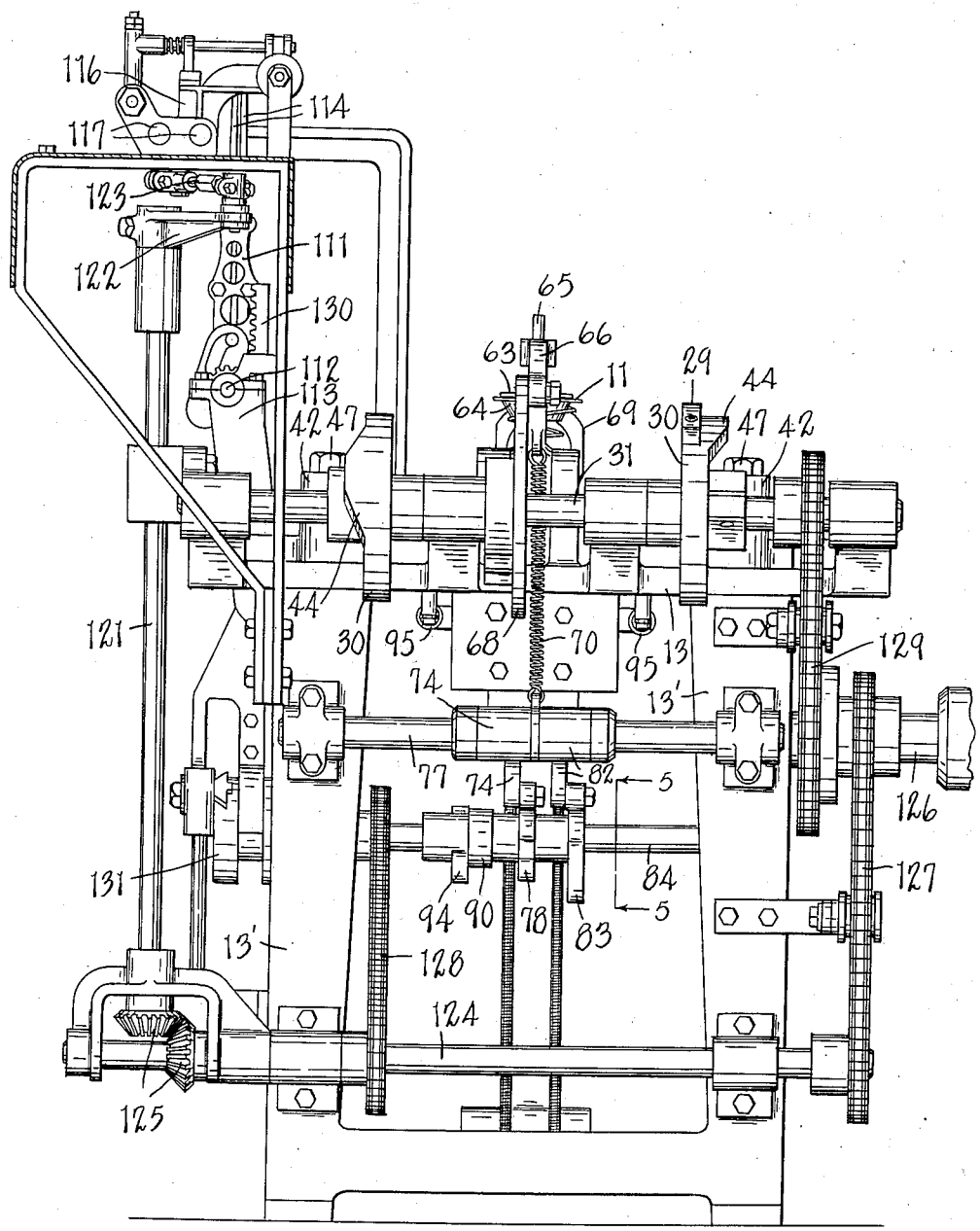
Fig. 2 is a front elevation, the drive connection to the coiling and knotting machine being broken away.

During the offsetting operation, the work is clamped upon the rest by means of the work clamp 63 having a conical portion 64 adapted to enter the top coil of the spring with the clamp resting thereon. This clamp has a central stem 65 adjustably mounted on the lever 66. This lever is pivoted at 67 to swing vertically, the lever being actuated by the cam 68 in proper timed relation to the transfer or feed arm 23 and to the work reversing mechanism designated generally by the numeral 69. The arm or lever 66 is retracted and its roller held in contact with the cam 68 by means of the spring 70, as best shown in Fig. 2. The adjustment of this work holder adapts it to springs of different heights and also enables the proper positioning of the coils while under compression to be engaged by the work turning jaws 71. This work turning device consists of a barrel or cylinder-like support 72 mounted in the upper end of the vertically reciprocating slide 73 (see Fig. 4), the slide being actuated by the lever arm 74 pivotally and adjustably connected to the lower end of the slide, a coupling 75 being threaded into the lower end of the slide and connected to the lever by means of the pin 76 (see Figs. 3 and 4). The lever is pivoted on the rod 77 on the opposite side of the machine (see Fig. 2) and is actuated by the cam 78 (see Fig. 2) and shown by dotted lines in Fig. 5.

The purpose of vertically reciprocating the turning device is to lift the work from the anvil or forming die prior to its rotation, the turning or reversing position of the spring relative to the forming die being indicated by dotted lines in Fig. 6.

The jaw spindle 79 is mounted within the support 69 for rotative and axial movement and is provided with an elongated pinion 80 meshing with the rack 81 mounted to reciprocate vertically in the slide and having a movement independent thereof. This rack 81 is actuated by a lever 82 connected to the lower end of the rack by an adjustable coupling 75 substantially the same as the coupling for the lever 74 to the slide, the lever 82 being pivoted on the rod 77 and being actuated by the cam 83, the cams 78 and 83 being both on the same shaft 84.

Axial movement is imparted to the spindle 79 by means of the lever 85 pivoted at 86 and having a slot 87 receiving the reduced end 88 of the spindle, the nut 89 serving as a thrust member, washers being provided to receive the wear. This lever 85 is actuated by the connecting rod 90 pivoted to the lever at 91 and having a slot 92 at its inner end receiving the shaft 84 and supporting the connecting rod with its thrust roller 93 in proper relation to the actuating cam 94 on the shaft 84, the relation of these parts being clearly shown in Fig. 3. The springs 95 act to urge the lever inwardly or to jaw engaging position—to the position shown by dotted lines in Fig. 3. The slotted connection for the spindle to the lever permits vertical movement of the slide.

The jaws 71 have segmentally curved body portions 96 slidably and rotatably mounted within a bearing member 97 in the support 72. These jaws are fulcrumed at 98 on a pin; that is, they have rocking engagement therewith as shown in Fig. 9. The opening movement of the jaws is limited by the pin 99 disposed transversely through the jaws and having springs 100 at each end which acts to open the jaws. The jaws are closed by the tapered or wedge portion 101 on the spindle, this wedge portion terminating in a tongue 102 disposed between the inner ends of the jaws and having a slot 103 therein providing a lost motion connection for the spindle to the jaws, and also affording a connection for the spindle to the jaws whereby the jaws are rotated. The jaws are provided with shoulders 104 which coact with the bearing 97 to limit the forward movement of the jaws. With the parts thus arranged, the work is positioned upon the work support and the mechanisms described operate to form the offsets in the bottom coil thereof.

Prior to the retraction of the holder 63, the spindle 79 is actuated longitudinally, first to advance the jaws to gripping position in which position the shoulders 104 are in engagement with the bearing 97, continued longitudinal movement or axial movement of the spindle owing to the lost motion connection bringing the jaw closing wedge 101 into operation to close the jaws. The work turning device is then given a vertical movement to lift the work from the forming die; the rack is then actuated to rotate the work to present the other end of it to the forming die, the reversing mechanism then being retracted to position the work upon the die. After the turning jaws have engaged the work, the work holder 63 is retracted and it is again actuated to clamp the work as it is released by the turning jaws, and the operation of the offset forming dies is then repeated.

It should be noted that the cams 78 and 83 are so arranged upon the shaft and so shaped that they have coinciding or correspondingly shaped dwell portions 105 and correspondingly shaped or registering lift portions 106 (see Fig. 5), the result being that the slide and the rack are at rest during a certain period of the cycle of operation but that they are both moved together during the period of lifting the spring from the anvil or to the position shown by dotted lines in Fig. 6.

The nose of the cam 78 is shorter than the nose of the cam 83 and has a dwell portion 107 which causes the support to remain in a fixed position during the rotating movement of the spindle which is caused by the portion 108 of the lift cam 83.

The rack 81 has a blank or toothless portion 109 at its upper end and a blank or toothless portion 110 below its teeth so that the independent movement of the slide is possible without rotating the spindle, these blank portions also serving to exactly determine the rotation of the spindle and prevent its accidental rotation during this independent movement of the slide.

After the offsets are formed in both ends of the spring as has been described, the work is engaged by the transfer arm 111 pivoted at 112 on the bracket 113. This arm is provided with work engaging jaws 114 which are adapted to engage the upper coil of the work resting upon the work rest and swing it to a horizontal position, as shown in Fig. 1, to be engaged by the jaws 115 of the nester mechanism.

The nester mechanism comprises a carriage 116 slidably mounted on the rods 117 to reciprocate towards and from the nester consisting of spaced upper and lower bars 118 and 119 provided with outwardly flaring collapsing means 120, this nesting mechanism being substantially that shown in the Van Orman et al. Patent No. 1,569,160 dated January 12, 1926. The jaw controlling means for the nesting mechanism is not illustrated and described in detail as it is, as stated, substantially that of the said patent. The movement of the carriage 116 and the opening and closing of the jaws 115 are timed in proper relation to the other parts of the machine, the carriage actuating means comprising the vertical shaft 121 having an arm 122 on its upper end connected by the link or connecting rod 123 to the carriage (see Fig. 2).

The shaft 121 is driven from the jack shaft 124, the shafts being connected by the beveled gears 125. The shaft 124 is connected to the driving shaft 126 which is the driving shaft driven from the spring forming machine 1, as it will be understood that it is necessary to synchronize the offsetting machine with the forming of the springs so that the transfer arm 23 takes the springs from the last knotter, as stated, delivering them to the offsetting mechanism.

The shaft 126 is connected to the jack shaft 124 by the sprocket chain 127 and suitable sprockets. The cam shaft 84 is connected to the jack shaft 124 by the sprocket chain 128 and suitable sprockets. The cam shaft 31 is connected to the shaft 126 by the sprocket chain 129 and suitable coacting sprockets. The delivery arm 111 is actuated by the rack 130 which is driven from the crank disk 131 on the cam shaft 84. The details of the connection for the rack to the crank disk are substantially as shown in the Van Orman Patent No. 1,569,160, and are therefore not further described herein.

By this arrangement and connection of the operating parts, they are all operated in proper timed relation, not only to each other but to the spring forming machine, so that the springs are formed and knotted at both ends, delivered to the work support, offsets formed in both ends, and then delivered to the nester.

The machine is highly efficient in that it is of large capacity and uniform results are secured.

I have illustrated and described a practical, commercial embodiment of my invention. I have not attempted to illustrate or describe other embodiments or adaptations of my improvements which I contemplate as it is believed that this disclosure wil enable those skilled in the art to which my invention relates to embody or adapt the same as may be desired.

Having thus described my invention, what I claim as new and desire to secure by Letters Patent, is:

1. In a machine of the class described, the combination of a work rest, a die or forming member on said work rest having oppositely disposed forming dies, and a work positioning shoulder, oppositely disposed reciprocatingly mounted jaw slides, forming jaws on said slides, an oscillating work holder acting to engage the top of the work acting when in actuated position to hold the work partially collapsed, a work positioning dog, a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position, a spring carried by the slide of the jaw coacting with the dog as a detent and adapted to overlie the bottom coil of the work when the jaw slide is in actuated position, a work feeding means for delivering work to said rest, means for reversing the work upon said rest, a spring nesting means, a work discharge means provided with work engaging jaws adapted to engage an intermediate coil of the work while on said work rest and transfer it into operative relation to said spring nesting means, and means for actuating said work feeding means, work holder, work positioning means, jaw slides, work reversing means and work discharge means in timed relation and sequence for the purpose described.

2. In a machine of the class described, the combination of a work rest, a die or forming member on said work rest having oppositely disposed forming dies, and a work positioning shoulder, oppositely disposed reciprocatingly mounted jaw slides, forming jaws on said slides, an oscillating work holder acting to engage the top of the work acting when in actuated position to hold the work partially collapsed, a work positioning dog, a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position, a spring carried by the slide of the jaw coacting with the dog as a detent and adapted to overlie the bottom coil of the work when the jaw slide is in actuated position, a work feeding means for delivering work to said rest, means for reversing the work upon said rest, and means for actuating said work feeding means, work holder, work positioning means, jaw slides, work reversing means in timed relation and sequence for the purpose specified.

3. In a machine of the class described, the combination of a work rest, a die or forming member on said work rest having oppositely disposed forming dies, oppositely disposed reciprocatingly mounted jaw slides, forming jaws on said slides, an oscillating work holder acting to engage the top of the work and acting when in actuated position to hold the work partially collapsed, a work feeding means for delivering work to said rest, means for reversing the work upon said rest, a spring nesting means, a work discharge means provided with work engaging jaws adapted to engage an intermediate coil of the work while on said work rest and transfer it into operative relation to said spring nesting means, and means for actuating said work feeding means, work holder, work positioning means, jaw slides, work reversing means and work discharge means in timed relation and sequence for the purpose specified.

4. In a machine of the class described, the combination of a work rest, a die or forming member on said work rest having oppositely disposed forming dies, oppositely disposed reciprocatingly mounted jaw slides, forming jaws on said slides, an oscillating work holder acting to engage the top of the work and acting when in actuated position to hold the work partially collapsed, a work feeding means for delivering work to said rest, means for reversing the work upon said rest, and means for actuating said work feeding means, work holder, work positioning means, jaw slides, work reversing means in timed relation and sequence for the purpose specified.

5. In a machine of the class described, the combination of a work rest, a die or forming member on said work rest having oppositely disposed male offset forming dies, a work positioning shoulder, curved coil supporting edges adjacent the forming dies, and a spirally curved work supporting top surface, oppositely disposed reciprocatingly mounted jaw slides, forming jaws on said slides, an oscillating work holder acting to engage the top of the work and having a conical projection extending into the top coil thereof and acting when in actuated position to hold the work partially collapsed, a work positioning dog, a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position, and a finger on the slide of the jaw coacting with the dog as a detent and adapted to overlie the bottom coil of the work when the jaw slide is in actuated position.

6. In a machine of the class described, the combination of a work rest, a die or forming member on said work rest having oppositely disposed male offset forming dies, a work positioning shoulder, curved coil supporting edges adjacent the forming dies, and a spirally curved work supporting top surface, oppositely disposed reciprocatingly mounted jaw slides, forming jaws on said slides, an oscillating work holder acting to engage the top of the work and having a conical projection extending into the top coil thereof and acting when in actuated position to hold the work partially collapsed, a work positioning dog, and a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position.

7. In a machine of the class described, the combination of a work rest, a die or forming member on said work rest having oppositely disposed male offset forming dies, curved coil supporting edges adjacent the forming dies, and a spirally curved work supporting top surface, oppositely disposed reciprocatingly mounted jaw slides, forming jaws on said slides, and an oscillating work holder acting to engage the top of the work and having a conical projection extending into the top coil thereof and acting when in actuated position to hold the work partially collapsed.

8. In a machine of the class described, the combination of a work rest, a die or forming member on said work rest having oppositely disposed male offset forming dies, curved coil supporting edges adjacent the forming dies, and a spirally curved work supporting top surface, oppositely disposed reciprocatingly mounted jaw slides, forming jaws mounted on said slides for adjustment transversely and longitudinally thereof, and an oscillating work holder acting to engage the top of the work and having a conical projection extending into the top coil thereof and acting when in actuated position to hold the work partially collapsed.

9. In a machine of the class described, the combination of a work rest, a die or forming member on said work rest having a work positioning shoulder, oppositely disposed reciprocatingly mounted jaw slides, forming jaws on said slides, a work positioning dog, a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position, and a finger on the slide of the jaw coacting with the dog as a detent and adapted to overlie the bottom coil of the work when the jaw slide is in actuated position.

10. In a machine of the class described, the combination of a work rest, a die or forming member on said work rest having a work positioning shoulder, oppositely disposed reciprocatingly mounted jaw slides, forming jaws on said slides, a work positioning dog, and a lever provided with a head adjustable longitudinally of the lever and on which said dog is reciprocatingly mounted, said dog having a keeper on its rear side and being provided with a spring acting to project it from the head, one of the jaws engaging said keeper acting as a detent to hold the dog in retracted position in said head when the lever is in retracted position.

11. In a machine of the class described, the combination of a work rest, a die or forming member on said work rest, a forming jaw coacting with said forming die, an oscillating work positioning lever, a spring projected work positioning dog on said lever, said forming jaw acting when the lever is in retracted position as a detent for holding the jaw in retracted position on the lever, means for feeding work to the rest, and means for actuating the work feeding means, the work positioning lever, and jaw in synchronized relation.

12. In a machine of the class described, the combination of a work rest, a die or forming member on said work rest, a forming jaw coacting with said forming die, a work positioning means including a stop acting to limit the rotation of the work, and means for rotating the work until limited by said stop, means for feeding work to the rest, and means for actuating the work feeding means, the work positioning means, and jaw in synchronized relation.

13. In a machine of the class described, the combination of a work rest, a die or forming member on said work rest having an offset forming die, a work positioning shoulder, and a coil supporting edge adjacent the forming die, a forming jaw coacting with said die, a work holder acting to engage the top of the work and having a conical portion extending into the top coil thereof and acting when in actuated position to hold the work partially collapsed, a work positioning means for rotating the work on its axis into a predetermined relation to said work positioning shoulder, and means for actuating the work positioning means and forming jaw in sequence.

14. In a machine of the class described, the combination of a work rest, a die or forming member on said work rest having an offset forming die, a work positioning shoulder, and a coil supporting edge adjacent the forming die, a forming jaw coacting with said die, a work holder acting to engage the top of the work and acting when in actuated position to hold the work partially collapsed, a work positioning means for rotating the work on its axis into a predetermined relation to said work positioning shoulder, and means for actuating the work positioning means and forming jaw in sequence.

15. In a machine of the class described, the combination of a work rest, a die or forming member on said work rest, a work holder acting to engage the top of the work and acting when in actuated position to hold the work partially collapsed, a work positioning means for bringing the work into a predetermined relation to said die and including a stop acting to limit the rotation of the work, and means for rotating the work until limited by said stop, and means for actuating the work positioning means and forming jaw in sequence.

16. In a machine of the class described, the combination of a work rest, a die or forming member on said work rest, a work positioning means for bringing the work into a predetermined relation to said die including a stop acting to limit the rotation of the work, and means for rotating the work until limited by said stop, and means for actuating the work positioning means and forming jaw in sequence.

17. In a machine of the class described, the combination of a work rest, a die or forming member on said work rest, oppositely disposed reciprocating jaws coacting with said forming member, a work holder acting to engage the top of the work and when in actuated position hold it partially collapsed, a work positioning dog mounted for oscillating and reciprocating movement, one of the jaws acting as a detent to hold the dog in retracted position, such jaw having a finger associated therewith to overlie the bottom coil of the work when the jaw is in actuated position, work feeding means adapted to deliver work to said work rest, means for reversing the work upon said rest, and means for actuating the work feeding means, work holder, work positioning means, forming jaws and reversing means in synchronized relation.

18. In a machine of the class described, the combination of a work rest, a die or forming member on said work rest, oppositely disposed reciprocating jaws coacting with said forming member, a work holder acting to engage the top of the work and when in actuated position hold it partially collapsed, a work positioning means, work feeding means adapted to deliver work to said work rest, means for reversing the work upon said rest, and means for actuating the work feeding means, work holder, work positioning means, forming jaws and reversing means in synchronized relation.

19. In a machine of the class described, the combination of a work rest, a die or forming member on said work rest, oppositely disposed reciprocating jaws coacting with said forming member, a work holder acting to engage the top of the work and when in actuated position hold it partially collapsed, a work positioning means, work feeding means adapted to deliver work to said work rest, means for reversing the work upon said rest, a spring nesting means, a discharge means adapted to engage an intermediate coil of the work on the work rest and carry it to operative relation to said spring nesting means, and means for actuating the work feeding means, work holder, work positioning means, forming jaws and reversing means in synchronized relation.

20. In a machine of the class described, the combination of a work rest, a die or forming member on said work rest having oppositely disposed male offset forming dies, oppositely disposed forming jaws coacting with said forming member, work feeding means adapted to deliver work to said work rest, means for reversing the work upon said rest, a spring nesting means, a discharge means adapted to engage an intermediate coil of the work on the work rest and carry it to operative relation to said spring nesting means, and means for actuating the work feeding means, work holder, forming jaws and reversing means in timed synchronized relation.

21. In a machine of the class described, the combination of a work rest, a die or forming member on said work rest having oppositely disposed male offset forming dies, oppositely disposed forming jaws coacting with said forming member, work feeding means adapted to deliver work to said work rest, means for reversing the work end-for-end upon said rest, and means for actuating the work feeding means, work holder, forming jaws and reversing means in timed synchronized relation.

22. In a machine of the class described, the combination of forming means, a feed means presenting one end coil of a coiled spring to said forming means, a reversing means presenting the other end coil of a coiled spring to said forming means, a work positioning means operatively associated with said forming means for rotatably positioning the work, a work holder engaging the upper end of the spring when presented to said forming means, a work discharge means, and means for actuating said work feeding means, work holder, work positioning means, work forming means, reversing means, and discharge means in synchronized relation.

23. In a machine of the class described, the combination of forming means, a feed means presenting one end coil of a coiled spring to said forming means, a reversing means presenting the other end coil of a coiled spring to said forming means, a work holder engaging the upper end of the spring when presented to said forming means, a work discharge means, and means for actuating said work feeding means, work holder, work forming means, reversing means, and discharge means in synchronized relation.

24. In a machine of the class described, the combination of forming means, a feed means presenting one end coil of a coiled spring to said forming means, a reversing means presenting the other end coil of a coiled spring to said forming means, a work positioning means operatively associated with said forming means for rotatably positioning the work, a work discharge means, and means for actuating said work feeding means, work positioning means, work forming means, reversing means, and discharge means in synchronized relation.

25. In a machine of the class described, the combination of forming means, a feed means presenting one end coil of a coiled spring to said forming means, a reversing means presenting the other end coil of a coiled spring to said forming means, a work discharge means, and means for actuating said work feeding means, work forming means, reversing means, and discharge means in synchronized relation.

26. In a machine of the class described, the combination of forming means, a feed means presenting one end coil of a coiled spring to said forming means, a reversing means presenting the other end coil of a coiled spring to said forming means, a work positioning means operatively associated with said forming means for rotatably positioning the work, a work holder engaging the upper end of the spring when presented to said forming means, and means for actuating said work feeding means, work holder, work positioning means, work forming means, and reversing means in synchronized relation.

27. In a machine of the class described, the combination of forming means, a feed means presenting one end coil of a coiled spring to said forming means, a reversing means presenting the other end coil of a coiled spring to said forming means, a work holder engaging the upper end of the spring when presented to said forming means, and means for actuating said work feeding means, work holder, work positioning means, work forming means, and reversing means in synchronized relation.

28. In a machine of the class described, the combination of forming means, a feed means presenting one end coil of a coiled spring to said forming means, a reversing means presenting the other end coil of a coiled spring to said forming means, a work positioning means operatively associated with said forming means for rotatably positioning the work, and means for actuating said work feeding means, work positioning means, work forming means, and reversing means in synchronized relation.

29. In a machine of the class described, the combination of forming means, a feed means presenting one end coil of a coiled spring to said forming means, a reversing means presenting the other end coil of a coiled spring to said forming means, and means for actuating said work feeding means, work forming means, and reversing means in synchronized relation.

30. In a machine of the class described, the combination of a forming die, and coacting forming jaw, work feeding means, means for positioning the work relative to said forming die, a work holder engaging the upper end of the work and acting to hold it partially collapsed, means for reversing the work, and means for discharging the work from said forming die.

31. In a machine of the class described, the combination of a work rest, a work forming means operatively associated therewith, a work holder acting to engage the top of the work and having a part extending into the top coil thereof, and a reversing means comprising a tubular support, a vertically reciprocating slide on which said support is mounted, a spindle mounted within said support for rotative and axial movement and provided with an elongated pinion, work engaging jaws rotatably mounted in said support, said jaws being pivotally associated within the support, a spring acting to open said jaws, a lost motion connection for said spindle to said jaws, said spindle having a wedge acting to close the jaws on the forward movement of the spindle, a reciprocating rack coacting with said pinion on said spindle, a spindle reciprocating lever having a longitudinal slot receiving said spindle, a cam shaft, actuating levers connected to said slide and rack, and cams on said cam shaft for actuating said levers, the cams for actuating said rack and slide actuating levers having portions of their dwells and lifts registering whereby the rack and slide are moved together during a part of their strokes and the rack is then actuated to rotate the spindle while the slide is in its elevated position, the rack having portions at each end of its teeth which coact with the pinion to prevent rotation of the spindle.

32. In a machine of the class described, the combination of a work rest, a work forming means operatively associated therewith, and a reversing means comprising a support, a vertically reciprocating slide on which said support is mounted, a spindle mounted on said support for rotative and axial movement and provided with an elongated pinion, work engaging jaws rotatably mounted on said support, said jaws being pivotally associated, a spring acting to open said jaws, a lost motion connection for said spindle to said jaws, said spindle having a wedge acting to close the jaws on the forward movement of the spindle, a reciprocating rack coacting with said pinion on said spindle, a cam shaft, actuating levers connected to said slide and rack, and cams on said cam shaft for actuating said levers, the cams for actuating said rack and slide actuating levers having portions of their dwells and lifts registering whereby the rack and slide are moved together during a part of their strokes and the rack is then actuated to rotate the spindle while the slide is in its elevated position, the rack having portions at each end of its teeth which coact with the pinion to prevent rotation of the spindle.

33. In a machine of the class described, the combination of a work rest, a work forming means operatively associated therewith, a reversing means comprising a reciprocatingly mounted support, a spindle mounted on said support for rotative and axial movement and provided with a pinion, work engaging jaws rotatably mounted on said support and having a lost motion connection to said spindle, said spindle having means acting to close the jaws on the forward axial movement of the spindle, a rack coacting with said pinion on said spindle, and synchronized means for actuating said rack and reciprocating said support and reciprocating said spindle.

34. In a machine of the class described, the combination of a work rest, a work forming means operatively associated therewith, a work reversing means comprising a reciprocatingly mounted support, a spindle mounted within said support for rotative and axial movement and provided with an elongated pinion, normally open work engaging jaws rotatably mounted on said support and connected to said spindle to be rotated thereby, said spindle acting to close the jaws on the forward axial movement of the spindle, a rack coacting with said pinion on said spindle, and synchronized means for actuating said rack and reciprocating said support and reciprocating said spindle.

35. In a machine of the class described, the combination of a work rest, a work forming means operatively associated therewith, a reversing means comprising a reciprocatingly mounted support, normally open jaws mounted on said support for rotative and reciprocating movement, means for closing said jaws at the end of their forward stroke to engage the work, and means for actuating the support while the jaws are in work engaging position and for rotating the jaws at the end of the out-stroke of the support and opening and retracting the jaws at the end of the instroke of the support.

PHILIP GRITZ.